United States Patent [19]
Chang et al.

[11] Patent Number: 5,684,392
[45] Date of Patent: Nov. 4, 1997

[54] SYSTEM FOR EXTENDING OPERATING TIME OF A BATTERY-OPERATED ELECTRONIC DEVICE

[75] Inventors: Chi Shih Chang, Austin, Tex.; Jonathan James Hurd, Lexington, Ky.; Stephen Francis Newton, Forney, Tex.

[73] Assignee: International Business Machines Corporation, Armonk, N.Y.

[21] Appl. No.: 538,661

[22] Filed: Oct. 3, 1995

[51] Int. Cl.$^6$ ..................................................... G05F 5/08
[52] U.S. Cl. ............................................. 323/303; 323/299
[58] Field of Search ..................................... 323/303, 299, 323/273, 282, 222; 307/66

[56] References Cited

U.S. PATENT DOCUMENTS

| | | | |
|---|---|---|---|
| 4,232,788 | 11/1980 | Smith | 307/66 |
| 4,553,196 | 11/1985 | Tokuyama et al. | 363/21 |
| 4,905,187 | 2/1990 | Beyers, Jr. | 364/900 |
| 5,021,679 | 6/1991 | Fairbanks et al. | 307/66 |
| 5,142,684 | 8/1992 | Perry et al. | 395/750 |
| 5,177,371 | 1/1993 | Faulk | 307/66 |
| 5,189,647 | 2/1993 | Suzuki et al. | 368/10 |
| 5,230,056 | 7/1993 | Hoshina | 395/750 |
| 5,307,003 | 4/1994 | Fairbanks et al. | 323/227 |
| 5,428,626 | 6/1995 | Frisch et al. | 371/27 |

*Primary Examiner*—Adolf Berhane
*Attorney, Agent, or Firm*—Arthur J. Samodovitz

[57] ABSTRACT

A system supplies power to and controls the frequency of electronic circuitry. The system comprises a DC source for supplying power to the electronic circuitry and a voltage controlled oscillator powered by the DC source. An output of the oscillator provides a system clock for the electronic circuitry such that as a voltage of the DC source continuously drops, the operating voltage of the electronic circuitry and oscillator continuously drops and the frequency of the system clock continuously drops in a manner corresponding to the continuous drop in operating voltage. Thus, the oscillator supplies an operating frequency tailored to the operating voltage to permit the electronic circuitry to operate at high speed.

21 Claims, 3 Drawing Sheets

SYSTEM FOR EXTENDING OPERATING TIME OF A BATTERY-OPERATED ELECTRONIC DEVICE

BACKGROUND OF THE INVENTION

The invention relates generally to oscillators/clocks for electronic devices and deals more particularly with a system to extend the operating time of a battery-operated electronic device by controlling an oscillator/clock frequency.

Many electronic devices, such as portable computers, are powered by a battery. All batteries have a limited charge capacity and, without recharge, will eventually output a lower than rated voltage. The electronic device can either be powered directly from the battery voltage or from a DC/DC converter interposed between the battery and the electronic device. In either case, as the battery voltage falls, eventually the operating voltage of the electronic device will fall below rated voltage. In the prior art, there were different ways to respond to this condition. The simplest response was to display a warning to the operator when the operating voltage fell below a predetermined level and then shut off the electronic device (such as a computer) a short time later. Another known response was to lower the clock frequency of the computer to a predetermined fraction of the normal frequency when the operating voltage fell below a predetermined level. See U.S. Pat. No. 5,230,256. This latter technique is effective in extending the operating time of the computer for the following reasons. The switching speed of the transistors in the computer is proportional to the operating voltage, so the rated voltage is only necessary to ensure that the transistors within the computer will switch fast enough to comply with the system clock. Therefore, if the operating voltage and system clock frequency are both reduced together, the computer will still operate reliably from the lower voltage, although slower. For many applications, this reduction in speed is not even noticeable.

While the foregoing technique to reduce the system clock frequency to a predetermined fraction when the operating voltage drops below a threshold level is effective, further improvements are desirable to maximize operating speed/frequency whenever the operating voltage drops below a predetermined level.

Accordingly, a general object of the present invention is to provide a system for extending the operating time of a battery operated computer or other electronic device while maximizing operating speed/frequency when the operating voltage drops below rated voltage.

SUMMARY

The invention resides in a system for supplying power to and controlling the frequency of electronic circuitry. The system comprises a DC source for supplying power to the electronic circuitry and a voltage controlled oscillator powered by the DC source. An output of the oscillator provides a system clock for the electronic circuitry such that as a voltage of the DC source continuously drops, the operating voltage of the electronic circuitry and oscillator continuously drops and the frequency of the system clock continuously drops in a manner corresponding to the continuous drop in operating voltage. Thus, the oscillator supplies an operating frequency tailored to the operating voltage to permit the electronic circuitry to operate at high speed.

According to one feature of the invention, voltage controlled oscillator is a ring oscillator. The ring oscillator comprises transistors, the electronic circuitry comprises transistors and the switching speed of the ring oscillator transistors and the electronic circuitry transistors are similarly affected by changes in the operating voltage. This causes the oscillator frequency to be tailored to the electronic circuitry such that the electronic circuitry can support the operating frequency as the operating voltage continuously drops.

DETAILED DESCRIPTION OF THE PREFERRED EMBODIMENTS

Figure 1:
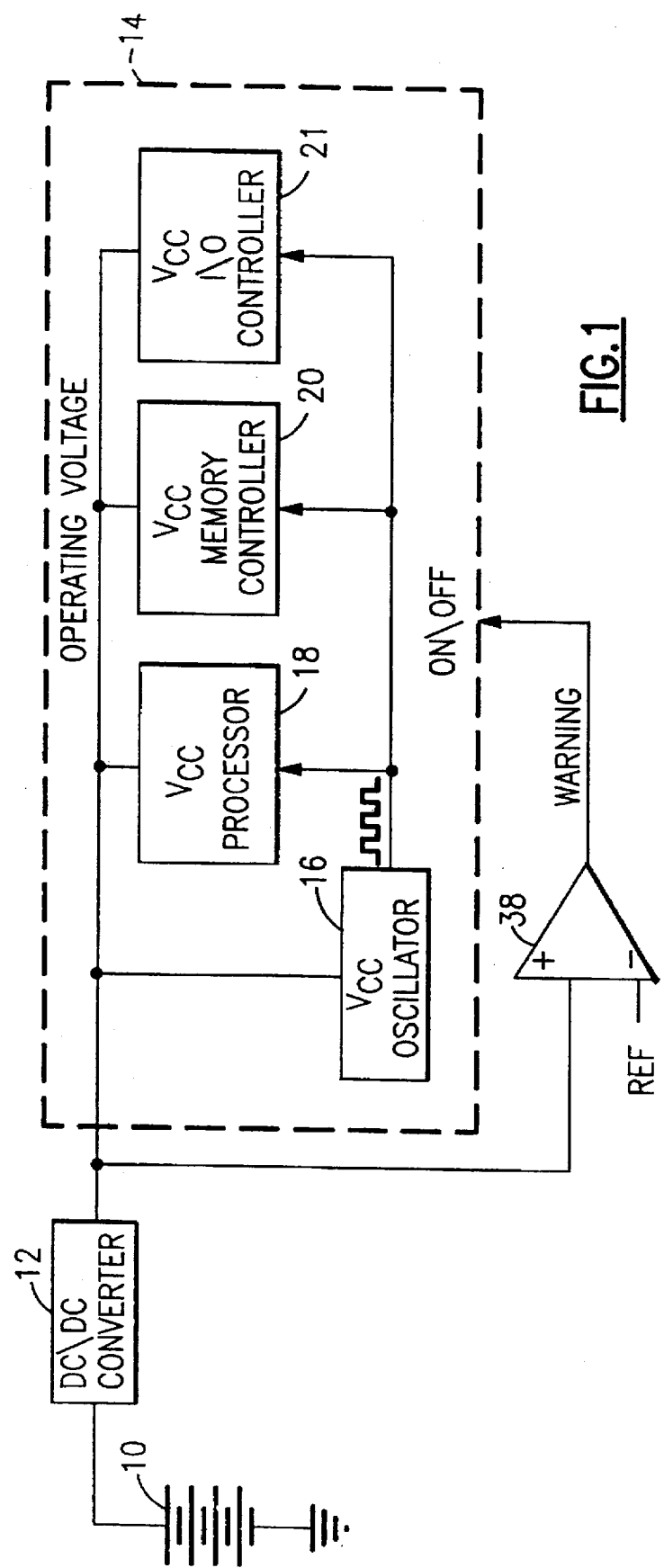
FIG. 1 is a block diagram of a battery, DC/DC converter and portable computer with a voltage controlled oscillator/clock according to the present invention.

Referring now to the drawings in detail wherein like reference numbers indicate like elements throughout, FIG. 1 illustrates a battery 10, a DC/DC converter 12 coupled to the battery and a computer 14 coupled to the output of the DC/DC converter. The computer includes a voltage controlled oscillator/clock 16, processor 18, memory controller hardware 20 and I/O controller hardware 22. By way of example, the battery 10 comprises four series 1.5 volt battery elements, and the DC/DC converter 12 outputs five volts when the battery 10 outputs five volts or greater.

Figure 2:
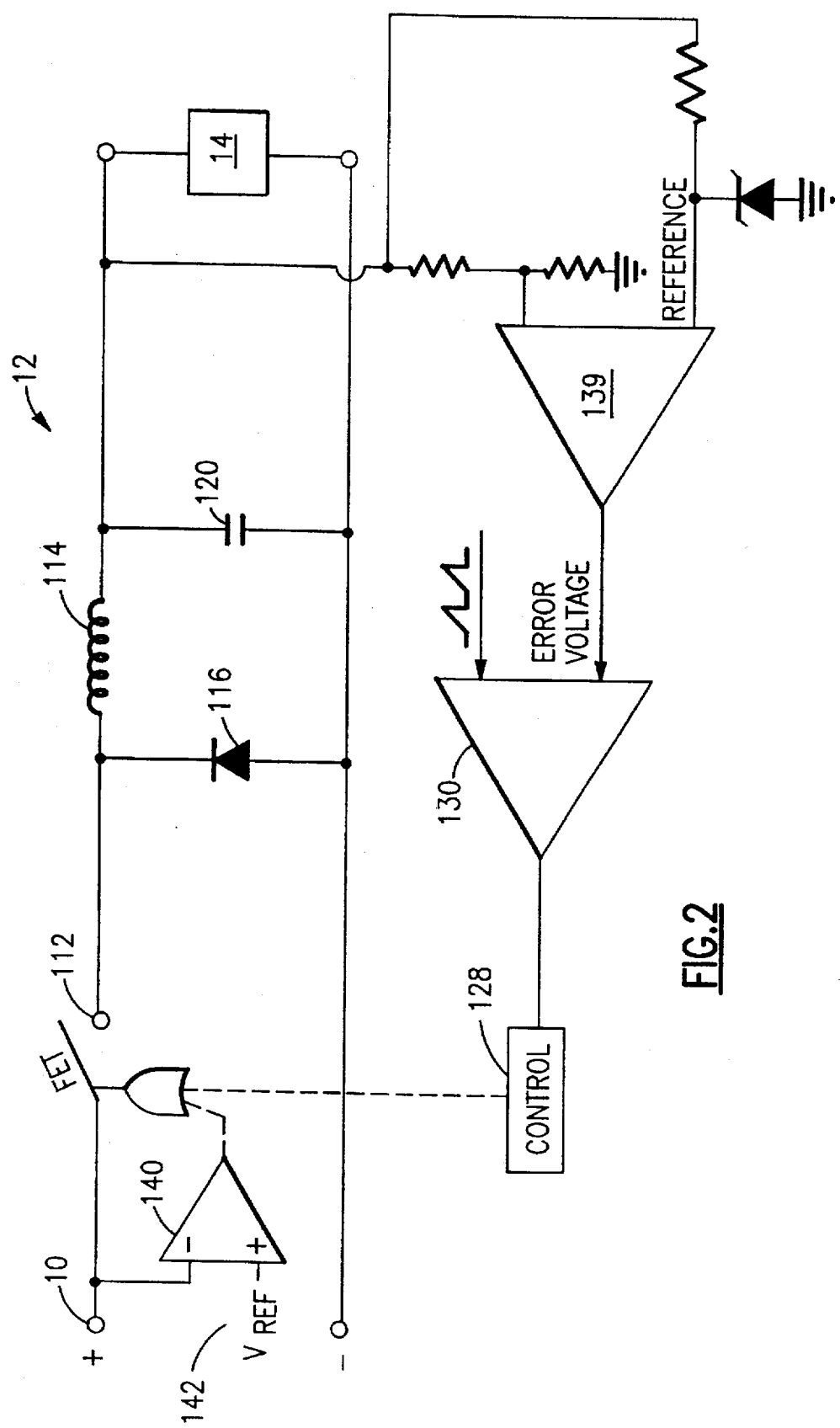
FIG. 2 is a circuit diagram of the DC/DC converter within FIG. 1.

As further illustrated in FIG. 2, DC/DC converter 12 is a "buck" variety and comprises a series FET switch 112, series inductor 114, parallel diode 116 and parallel, output capacitor 120. When switch 112 is closed, a current flows through inductor 114 to supply computer 14 (the "load"), and charge capacitor 120. Subsequently, switch 112 is opened to block or "buck" the input power, but inductor 114 and capacitor 120 continue to deliver stored energy to the load in the manner of a low pass filter. The closing and opening of switch 112 is repeated to yield a DC output voltage, less than the input battery voltage, with ripple. The closing and opening of switch 112 is based on the following. A comparison 139 of the load voltage to a reference voltage yields an "error" voltage, and the error voltage is compared 130 to a saw tooth reference voltage. The result of comparison 130 triggers a control 128 for switch 112 to maintain the load voltage within a specified range. Control 128 also ensures that each closure of switch 112 occurs when there is approximately zero volts across switch 112 to minimize surge currents and switching losses. DC/DC converter 12 also includes a control (comparator 140) to maintain switch 112 continuously "on" if the battery voltage falls below a reference voltage 142. While switch 112 is continuously on, the full battery voltage is applied to the load via switch 112 and inductor 114.

Figure 3:
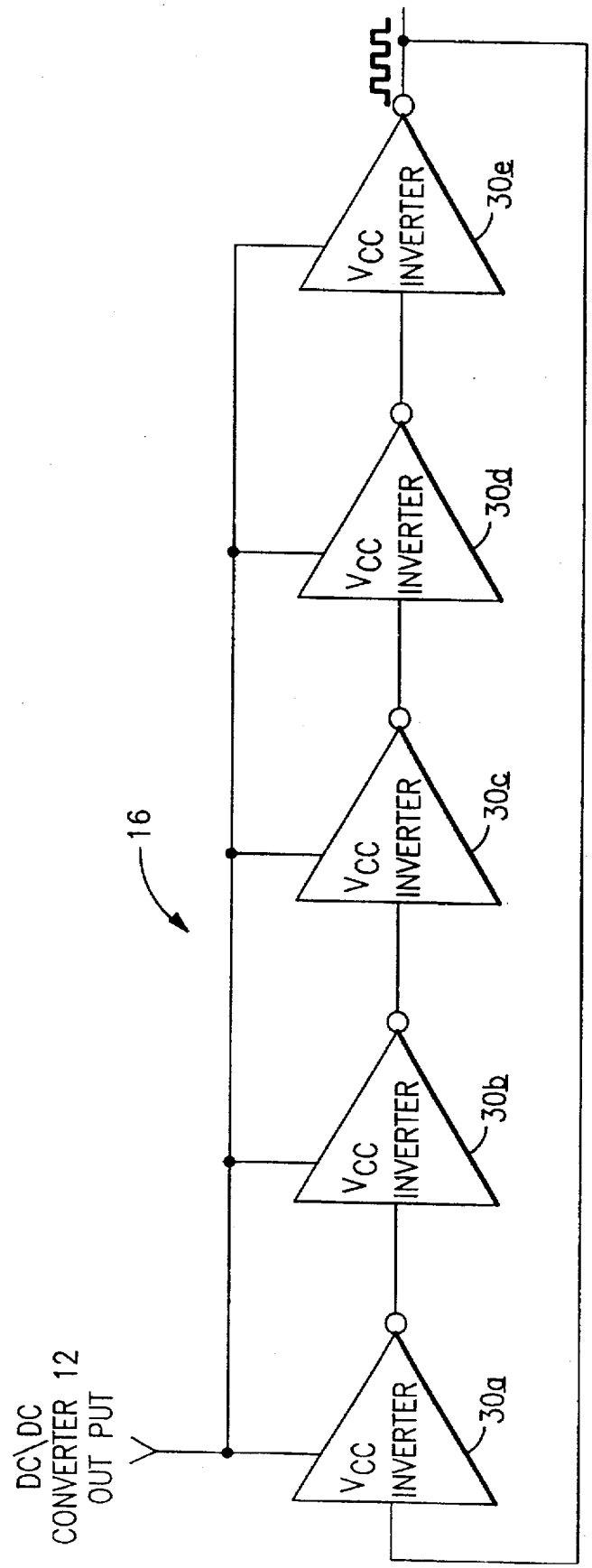
FIG. 3 is a circuit diagram of the voltage controlled oscillator/clock within FIG. 1, in accordance with the present invention.

FIG. 3 further illustrates a preferred embodiment of the voltage controlled oscillator/clock 16, i.e. a ring oscillator. The ring oscillator comprises an odd number, for example five, of digital inverter gates 30a–e. The total propagation delay through the five inverters and associated wiring equals one half the period of the resultant clock. The propagation delay through each inverter depends on the operating voltage because each inverter comprises transistors whose switching time is proportional to the operating voltage. Thus, as the operating voltage decreases, the propagation delay through each inverter increases and the resultant clock frequency decreases. Preferably, the inverters are fabricated from the same technology—type and dimensions of transistor, as the computer 14 so that the decrease in frequency of the ring oscillator 16 matches the decrease in operating speed of the computer 14 as the operating voltage decreases. It should be noted that in contrast to the prior art described above, in the present invention, the decrease in operating frequency of the computer 14 (or other electronic device) is continuous as the operating voltage decreases; this decrease in frequency of oscillator/clock 16 is not to a fixed, predetermined second frequency as in the prior art. Consequently, the present invention maintains maximum operating speed of the computer permitted by the operating voltage.

When the battery voltage drops so much that reliable operation of the computer can no longer be assured as indicated by a comparator 38 in FIG. 1, the computer displays a warning and then is shut off by a signal from comparator 38.

Based on the foregoing, an oscillator/clock control for a battery powered electronic device has been disclosed according to the present invention. However, numerous modifications and substitutions can be made without deviating from the scope of the present invention. For example, a standard boost converter can substitute for the buck converter 12. Also, other types of voltage controlled oscillators such as a variable reference relaxation oscillator can substitute for the ring oscillator 16 provided the output frequency can be supported by the electronic circuitry as the operating voltage drops. Ideally, the output frequency of the voltage controlled oscillator permits maximum operating speed of the electronic circuitry as the operating voltage drops. Therefore, the invention has been disclosed by way of illustration and not limitation and reference should be made to the following claims to determine the scope of the present invention.

We claim:

1. Apparatus for supplying power to and controlling a frequency of a system clock for electronic circuitry, said apparatus comprising:

a DC source for supplying an operating voltage for said electronic circuitry; and oscillator means, coupled to said electronic circuitry, for producing a system clock for said electronic circuitry such that as said operating voltage of said electronic circuitry continuously decreases due to a continuous decrease of a voltage of said DC source, the frequency of said system clock continuously decreases in a manner corresponding to the continuous decrease in said operating voltage.

2. Apparatus as set forth in claim 1 wherein said oscillator means is a ring oscillator and said ring oscillator operates from said operating voltage from said DC source.

3. Apparatus as set forth in claim 2 wherein said ring oscillator comprises transistors, said electronic circuitry comprises transistors and switching speeds of said ring oscillator transistors and said electronic circuitry transistors are similarly affected by changes in the operating voltage.

4. Apparatus as set forth in claim 3 wherein said ring oscillator transistors are a same type as said electronic circuitry transistors.

5. Apparatus as set forth in claim 2 wherein said electronic circuitry comprises a processor powered from said operating voltage and is coupled to receive an output of said ring oscillator as a system clock for said processor.

6. Apparatus as set forth in claim 1 wherein said DC source comprises a battery and a DC/DC converter powered by said battery and coupled to supply said operating voltage to said electronic circuitry.

7. Apparatus as set forth in claim 2 wherein said ring oscillator comprises a multiplicity of inverters connected in a ring configuration.

8. Apparatus as set forth in claim 1 wherein said DC source comprises:

a battery exhibiting a higher rated voltage than a rated voltage of said electronic circuitry;

a DC/DC converter powered by said battery and outputting said rated voltage of said electronic circuitry when the battery voltage is greater than said rated voltage of said electronic circuitry; and a switch to connect the battery to said electronic circuitry, bypassing said DC/DC converter when the battery voltage drops below the rated voltage of said electronic circuitry.

9. Apparatus as set forth in claim 2 wherein the frequency of said clock produced by said oscillator means depends on the operating voltage of said oscillator means.

10. Apparatus for controlling frequency of a system clock for electronic circuitry, said apparatus comprising:

a ring oscillator;

means for coupling said oscillator and said electronic circuitry to a DC source to receive operating voltage therefrom; and means for coupling a clock output of said oscillator to said electronic circuitry to provide a system clock for said electronic circuitry, as the operating voltage continuously decreases, a frequency of the clock output of said oscillator continuously decreases such that a frequency of said system clock decreases corresponding to reduction in switching speed of transistors within said electronic circuitry, said switching speed continuously decreasing as said operating voltage continuously decreases.

11. Apparatus as set forth in claim 10 wherein said ring oscillator comprises transistors, said electronic circuitry comprises transistors and switching speed of said ring oscillator transistors and said electronic circuitry transistors are similarly affected by changes in said operating voltage.

12. Apparatus as set forth in claim 10 wherein said ring oscillator transistors are a same type as said electronic circuitry transistors.

13. Apparatus as set forth in claim 10 wherein said electronic circuitry comprises a processor powered from said operating voltage and coupled to receive said clock output of said oscillator as a clock for said processor.

14. Apparatus as set forth in claim 10 wherein said DC source comprises a battery and a DC/DC converter powered by said battery, an output of said DC/DC converter providing said operating voltage.

15. Apparatus as set forth in claim 10 wherein said DC source comprises:

a battery exhibiting a higher rated voltage than a rated voltage of said electronic circuitry;

a DC/DC converter powered by said battery and outputting said rated voltage of said electronic circuitry when the battery voltage is greater than said rated voltage of said electronic circuitry; and a switch to connect the battery to said electronic circuitry, bypassing said DC/DC converter when the battery voltage drops below the rated voltage of said electronic circuitry.

16. Apparatus as set forth in claim 10 wherein the frequency of said clock produced by said oscillator depends on the operating voltage of said oscillator.

17. A method for supplying power to electronic circuitry and controlling a frequency of a clock for said electronic circuitry, said method comprising the steps of:

supplying a gradually decreasing operating voltage to said electronic circuitry; and decreasing the clock frequency for said electronic circuitry as said operating voltage gradually decreases such that a switching speed of transistors within said electronic circuitry keeps pace with said clock frequency, said switching speed continuously decreasing as said operating voltage continuously decreases.

18. A method as set forth in claim 17 wherein the clock frequency is controlled by supplying said clock with said gradually decreasing operating voltage as an operating voltage of said clock, the frequency of said clock depending on the operating voltage of said clock.

19. A method as set forth in claim 17 wherein said clock is provided by a ring oscillator and said operating voltage is supplied to said ring oscillator as an operating voltage for said ring oscillator.

20. A method as set forth in claim 19 wherein the clock frequency depends on the operating voltage of said oscillator.

21. A method as set forth in claim 19 wherein said ring oscillator comprises transistors, said electronic circuitry comprises transistors and switching speed of said ring oscillator transistors and said electronic circuitry transistors are similarly affected by changes in said operating voltage.

* * * * *